(12) United States Patent
Taniguchi

(10) Patent No.: US 10,268,034 B2
(45) Date of Patent: Apr. 23, 2019

(54) TELESCOPE, AND METHOD FOR MANUFACTURING TELESCOPE

(71) Applicant: Hiroshi Taniguchi, Tokyo (JP)

(72) Inventor: Hiroshi Taniguchi, Tokyo (JP)

(*) Notice: Subject to any disclaimer, the term of this patent is extended or adjusted under 35 U.S.C. 154(b) by 77 days.

(21) Appl. No.: 15/071,736

(22) Filed: Mar. 16, 2016

(65) Prior Publication Data

US 2016/0274348 A1    Sep. 22, 2016

(30) Foreign Application Priority Data

Mar. 17, 2015 (JP) ................. 2015-053218

(51) Int. Cl.
  *G02B 23/06* (2006.01)
  *G02B 7/182* (2006.01)

(52) U.S. Cl.
  CPC ............ *G02B 23/06* (2013.01); *G02B 7/182* (2013.01)

(58) Field of Classification Search
  CPC .................. G02B 23/06; G02B 7/182
  USPC ........................................... 359/365
  See application file for complete search history.

(56) References Cited

U.S. PATENT DOCUMENTS

| 2,869,423 A * | 1/1959 | Hoge ................. G02B 17/0626 353/99 |
| 5,841,575 A * | 11/1998 | Visser ................... G01J 3/2823 359/365 |
| 6,519,084 B1 | 2/2003 | Kawasaki |
| 2005/0259919 A1 * | 11/2005 | Aldridge ................. G02B 6/34 385/37 |

FOREIGN PATENT DOCUMENTS

| JP | 2000-258695 A | 9/2000 |
| JP | 2010-079257 A | 4/2010 |
| JP | 2013-174845 A | 9/2013 |

* cited by examiner

*Primary Examiner* — Stephone B Allen
*Assistant Examiner* — Rahman Abdur
(74) *Attorney, Agent, or Firm* — Ladas & Parry LLP

(57) ABSTRACT

A telescope includes a first reflector having a first concave cylindrical surface with a first radius and a second reflector having a second concave cylindrical surface with a second radius different from the first radius, and a fixing member configured to fix the first reflector and the second reflector in such a way that the first concave cylindrical surface and the second concave cylindrical surface face each other and a central axis of the first concave cylindrical surface and a central axis of the second concave cylindrical surface are orthogonal to each other.

5 Claims, 4 Drawing Sheets

TELESCOPE, AND METHOD FOR MANUFACTURING TELESCOPE

CROSS-REFERENCE TO RELATED APPLICATIONS

The present application is based on and claims the benefit of priority of Japanese Priority Application No. 2015-053218 filed on Mar. 17, 2015, the entire contents of which are hereby incorporated by reference.

BACKGROUND OF THE INVENTION

1. Field of the Invention

The present invention is related to a telescope and a method of manufacturing a telescope.

2. Description of the Related Art

Various techniques have been developed related to a telescope and a method of manufacturing a telescope.

For example, reflecting telescopes with a reflector such as a Newtonian telescope and a Schmidt-Cassegrain telescope are known. A reflector of the Newtonian telescope uses, for example, a parabolic mirror or a spherical mirror. A reflector of the Schmidt-Cassegrain telescope uses, for example, a parabolic mirror or a hyperbolic mirror.

However, it is not easy to manufacture and maintain a spherical mirror, a parabolic mirror, or a hyperbolic mirror used for a telescope, by using means such as polishing.

Further, a spherical mirror, a parabolic mirror, or a hyperbolic mirror used for a telescope is made of, for example, metal. As a result, the shape of a spherical mirror, a parabolic mirror, or a hyperbolic mirror used for a telescope is distorted under strong gravity or high acceleration. The greater the gravity or the acceleration is, the more the shape is distorted. The more the shape of a spherical mirror, a parabolic mirror, or a hyperbolic mirror used for a telescope is distorted, the more the resolution of the telescope is degraded. For example, it is known that the degradation of the resolution of the Hubble Space Telescope was caused by mirror surface distortion in the Hubble Space Telescope.

An object of the present invention is to provide a telescope that can be easily manufactured and maintained.

Another object of the present invention is to provide a method of manufacturing a telescope that can be easily manufactured and maintained.

SUMMARY OF THE INVENTION

An aspect of the present invention provides a telescope. The telescope includes a first reflector configured to have a first concave cylindrical surface with a first radius, a second reflector configured to have a second concave cylindrical surface with a second radius different from the first radius, and a fixing member configured to fix the first reflector and the second reflector in such a way that the first concave cylindrical surface and the second concave cylindrical surface face each other, and a central axis of the first concave cylindrical surface and a central axis of the second concave cylindrical surface are orthogonal to each other.

Another aspect of the present invention provides a method of manufacturing a telescope. The method includes a first step of manufacturing a first reflector having a first concave cylindrical surface by cutting a first tube having the first concave cylindrical surface with a first radius and a first central axis, parallel to the first central axis, a second step of manufacturing a second reflector having a second concave cylindrical surface by cutting a second tube having the second concave cylindrical surface with a second radius different from the first radius and a second central axis, parallel to the second central axis, and a third step of fixing the first reflector and the second reflector in such a way that the first concave cylindrical surface and the second concave cylindrical surface face each other, and a central axis of the first concave cylindrical surface and a central axis of the second concave cylindrical surface are orthogonal to each other.

According to an aspect of the present invention, it is possible to provide a telescope that can be easily manufactured and maintained.

According to another aspect of the present invention, it is possible to provide a method of manufacturing a telescope that can be easily manufactured and maintained.

DETAILED DESCRIPTION OF THE PREFERRED EMBODIMENTS

Next, referring to accompanying drawings, embodiments of the present invention will be described.

Figure 1A:
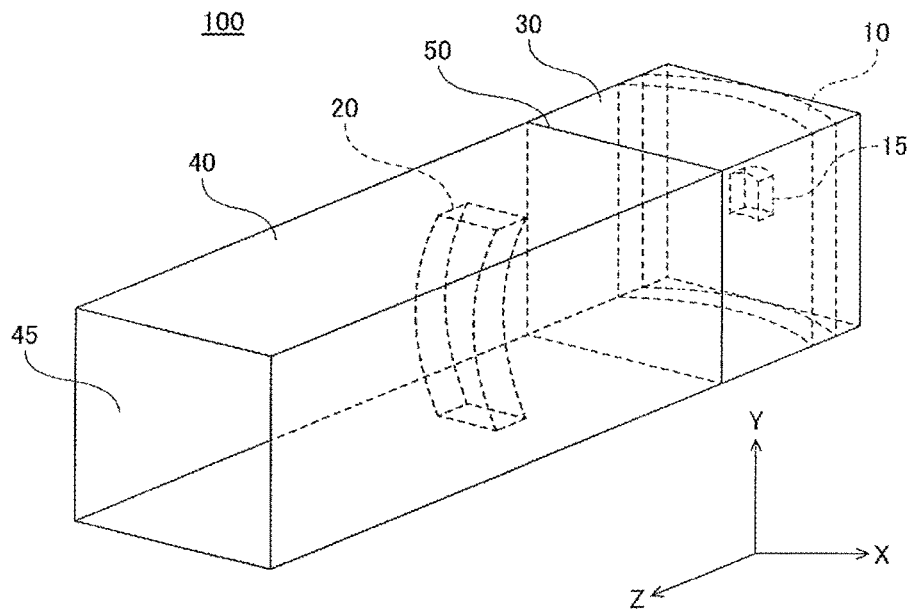
FIGS. 1A-1C are drawings illustrating a structure of a telescope according to a first embodiment of the present invention.
Figure 1B:
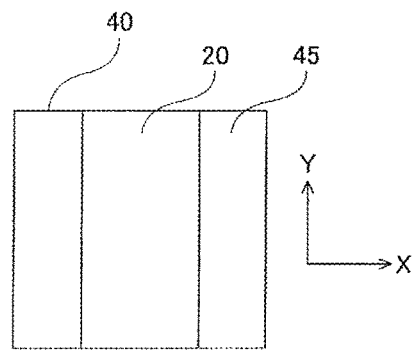
Figure 1C:
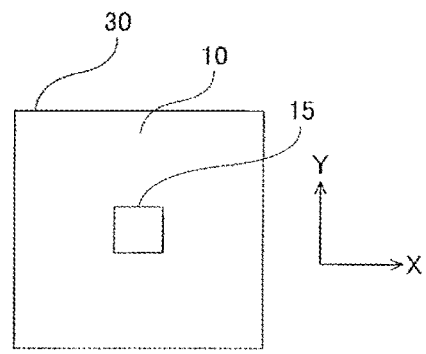

FIGS. 1A-1C are drawings illustrating a structure of a telescope 100 according to a first embodiment of the present invention. FIG. 1A is a perspective view illustrating a structure of the telescope 100. FIG. 1B is a front view illustrating a structure of the telescope 100. FIG. 1C is a rear view illustrating a structure of the telescope 100.

As shown in FIG. 1A, the telescope 100 includes a first reflector 10 and a second reflector 20. An optical axis of the second reflector 20 may coincide with an optical axis of the first reflector 10. The first reflector 10 and the second reflector 20 may be disposed in such a way that a mirror surface of the reflector 10 and a mirror surface of the reflector 20 face each other.

As shown in FIG. 1A, the telescope 100 includes a first fixing member 30 and a second fixing member 40. The first fixing member 30 is used for fixing the first reflector 10. The second fixing member 40 is used for fixing the second reflector 20. The first fixing member 30 and the second fixing member 40 are attachable to each other at a connecting portion 50. It is preferable that the first fixing member 30 and the second fixing member 40 be detachable at the connecting portion 50. It is preferable that an inner surface of the first fixing member 30 and an inner surface of the second fixing member 40 include flocked paper for removing stray light. The first fixing member 30 and the second fixing member 40 are included as a fixing member of the telescope 100 for fixing the first reflector 10 and the second reflector 20. Light enters the telescope 100 from an opening 45 of the second fixing member 40. A wavelength of the light that enters the telescope 100 is not specifically limited. The light that enters the telescope 100 may be, for example, visible light or radio waves.

As shown in FIG. 1A, a direction of Z axis is a direction of the optical axis of the first reflector 10. A direction of X axis and a direction of Y axis are orthogonal to the direction of Z axis. The direction of X axis and the direction of Y axis are orthogonal to each other.

As shown in FIG. 1B, the second reflector 20 is disposed at the center of the second fixing member 40 in X direction. A cross-sectional area of the second reflector 20 in XY plane may be about a half of a cross-sectional area of the opening 45 of the second fixing member 40 in XY plane.

As shown in FIG. 1C, the first reflector 10 may have an opening 15 in a central part of the first reflector 10 in XY plane.

Figure 2A:
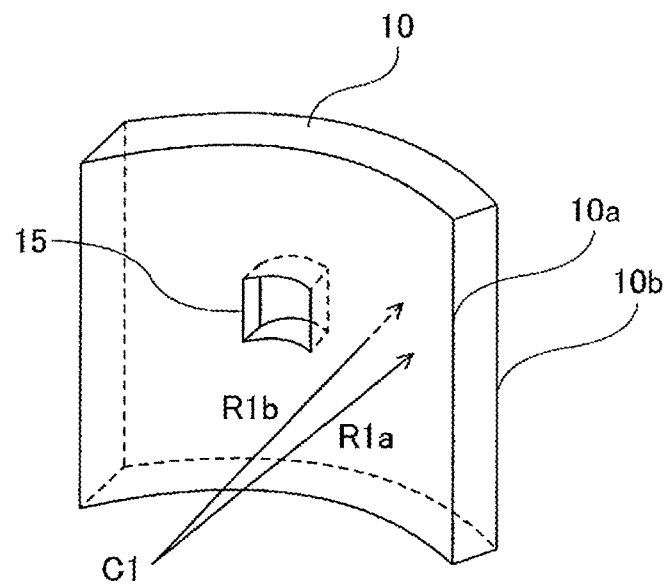
FIGS. 2A-2B are drawings illustrating a structure of a part of a telescope according to a first embodiment.
Figure 2B:
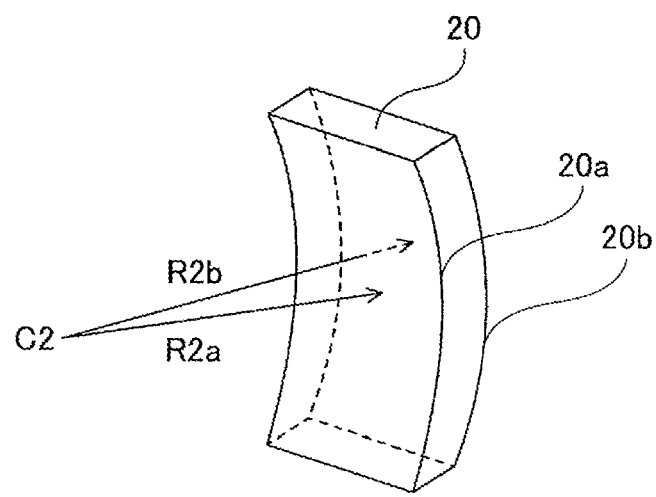

FIGS. 2A-2B are drawings illustrating structures of parts of the telescope 100. FIG. 2A is a drawing illustrating a structure of the first reflector 10. FIG. 2B is a drawing illustrating a structure of the second reflector 20.

As shown in FIG. 2A, the first reflector 10 shown in FIG. 1A includes a first concave cylindrical surface 10a and a first convex cylindrical surface 10b. The first concave cylindrical surface 10a has a central axis including a point C1 and has a first radius R1a. The first convex cylindrical surface 10b has the central axis including the point C1 and a radius R1b. The first radius R1a is less than the radius R1b. The first concave cylindrical surface 10a and the first convex cylindrical surface 10b have the same central axis.

As shown in FIG. 2B, the second reflector 20 shown in FIG. 1A includes a second concave cylindrical surface 20a and a second convex cylindrical surface 20b. The second concave cylindrical surface 20a has a central axis including a point C2 and has a second radius R2a. The second convex cylindrical surface 20b has the central axis including the point C2 and a radius R2b. The second radius R2a is less than the radius R2b. The second concave cylindrical surface 20a and the second convex cylindrical surface 20b have the same central axis.

The first radius R1a and the second radius R2a are different from each other. The second radius R2a may be about a half of the first radius R1a.

As shown in FIGS. 1A, 2A-2B, the first reflector 10 and the second reflector 20 are disposed in such a way that the first concave cylindrical surface 10a and the second concave cylindrical surface 20a face each other and the central axis of the first concave cylindrical surface 10a and the central axis of the second concave cylindrical surface 20a are orthogonal to each other.

Figure 3A:
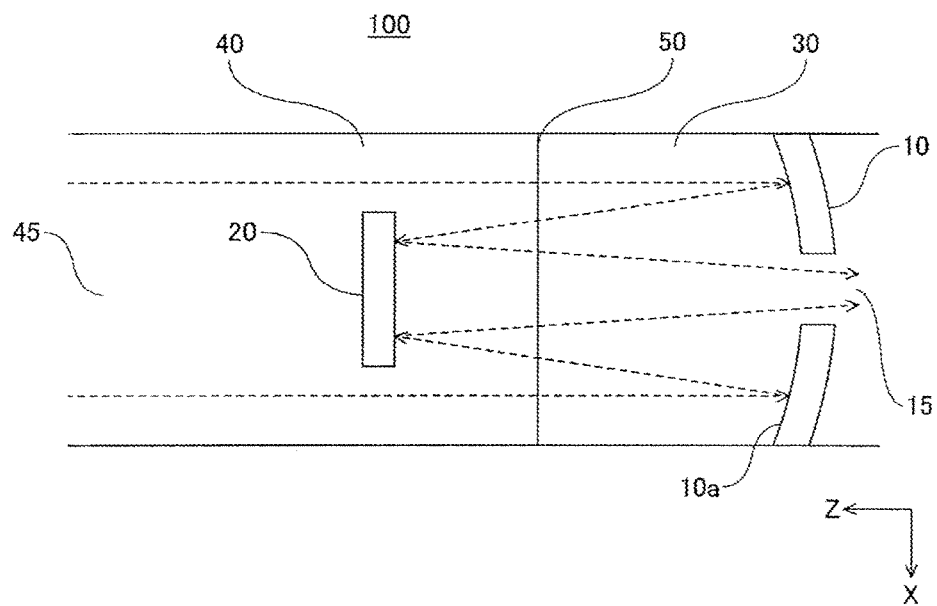
FIGS. 3A-3B are drawings illustrating an operation of a telescope according to the first embodiment.
Figure 3B:
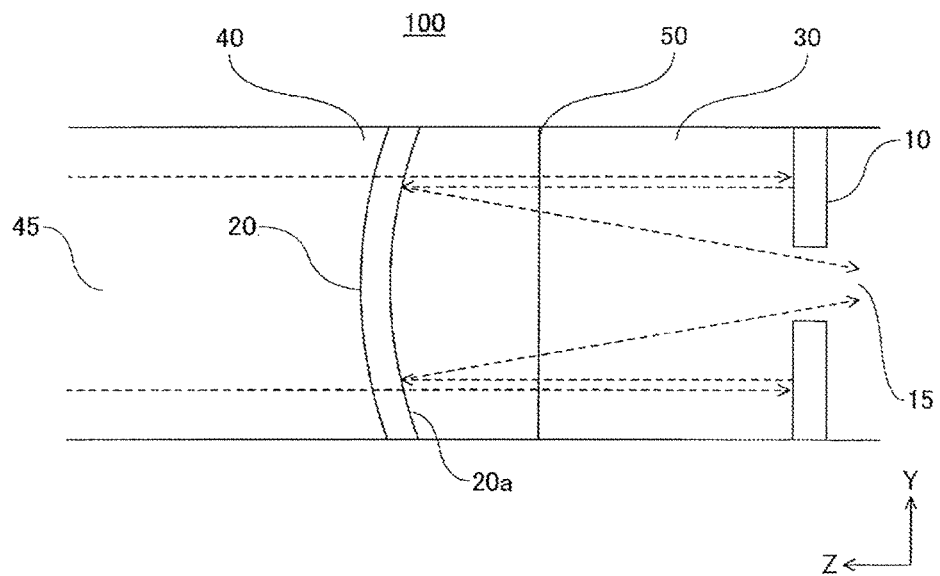

FIGS. 3A-3B are drawings illustrating an operation of a telescope 100 according to a first embodiment. FIG. 3A is an XZ cross-sectional view illustrating an operation of the telescope 100. FIG. 3B is a YZ cross-sectional view illustrating an operation of the telescope 100.

As shown in FIGS. 3A and 3B, parallel light rays enter the inside of the telescope 100 through the opening 45 of the second fixing member 40 of the telescope 100. The parallel light rays that have entered the telescope 100 from the opening 45 of the second fixing member 40 of the telescope 100 pass both sides of the second reflector 20, and are reflected by the first reflector 10. The light rays reflected by the first reflector 10 are reflected by the second reflector 20. The light rays reflected by the second reflector 20 pass through the opening 15 of the first reflector 10. The light rays that have passed through the opening 15 of the first reflector 10 are observed by human eyes via an ocular or eyepiece (not shown), detected by a detector such as a charge coupled device (CCD), or used for imaging by an imaging device such as a camera. As shown in FIG. 3A, a length in X direction of the second reflector 20 may be about a half of a length in X direction of the first reflector 10.

As shown in FIG. 3A, the first reflector 10 functions as a concave spherical mirror and the second reflector 20 functions as a planar mirror in XZ cross section of the telescope 100. The parallel light rays that have entered the telescope 100 from the opening 45 of the second fixing member 40 are reflected by the first reflector 10 to form a linear image in Y direction according to power of the first concave cylindrical surface 10a of the first reflector 10.

As shown in FIG. 3B, the first reflector 10 functions as a planar mirror and the second reflector 20 functions as a concave spherical mirror in YZ cross section of the telescope 100. The light rays reflected by the first reflector 10 are reflected by the second reflector 20 to form a linear image in X direction according to power of the second concave cylindrical surface 20a of the second reflector 20.

As shown in FIGS. 3A and 3B, the parallel light rays that have entered the telescope 100 from the opening 45 of the second fixing member 40 are reflected by the first reflector 10 and the second reflector 20 to form a point-like image in XY plane because the parallel light rays are reflected by the first reflector 10 and the second reflector 20 to form a linear image in Y direction according to the power of the first concave cylindrical surface 10a of the first reflector 10 and to form a linear image in X direction according to the power of the second concave cylindrical surface 20a of the second reflector 20.

According to a first embodiment of the present invention, the first reflector 10 can be manufactured from a first tube having the first concave cylindrical surface 10a with the first radius R1a and the first convex cylindrical surface 10b with the same axis as the first concave cylindrical surface 10a because the telescope 100 includes the first reflector 10 that has the first concave cylindrical 10a with the first radius R1a and the first convex cylindrical surface 10b with the same axis as the first concave cylindrical surface 10a. In other words, according to the first embodiment of the present invention, the first reflector 10 can be manufactured more easily.

According to the first embodiment, the second reflector 20 can be manufactured from a second tube having the second concave cylindrical surface 20a with the second radius R2a and the second convex cylindrical surface 20b with the same axis as the second concave cylindrical surface 20a because the telescope 100 includes the second reflector 20 that has the second concave cylindrical 20a with the second radius R2a and the second convex cylindrical surface 20b with the same axis as the second concave cylindrical surface 20a. In other words, according to the first embodiment of the present invention, the second reflector 20 can be manufactured more easily.

As a result, the telescope 100 can be manufactured more easily.

According to the first embodiment, the first reflector 10 can be manufactured more easily, and thus, it is easy to exchange the first reflector 10 included in the telescope 100.

According to the first embodiment, the second reflector 20 can be manufactured more easily, and thus, it is easy to exchange the second reflector 20 included in the telescope 100.

According to the first embodiment, it is possible to adjust a shape of the first concave cylindrical surface 10a, if necessary, by grinding the first concave cylindrical surface 10a in a direction orthogonal to the central axis of the first concave cylindrical surface 10a because the telescope 100 includes the first reflector 10 having the first concave cylindrical surface 10a with the first radius R1a.

According to the first embodiment, it is possible to adjust a shape of the second concave cylindrical surface 20a, if necessary, by grinding the second concave cylindrical surface 20a in a direction orthogonal to the central axis of the second concave cylindrical surface 20a because the telescope 100 includes the second reflector 20 having the second concave cylindrical surface 20a with the second radius R2a.

As a result, the telescope 100 can be maintained more easily.

According to the first embodiment, it is possible to reduce a volume and/or a weight of the first reflector 10 because the telescope 100 includes the first reflector 10 having the first concave cylindrical surface 10a with the first radius R1a and the first convex cylindrical surface 10b with the same axis as the first concave cylindrical surface 10a. In other words, according to the first embodiment, it is possible to reduce a size and/or a weight of the first reflector 10.

According to the first embodiment, it is possible to reduce a volume and/or a weight of the second reflector 20 because the telescope 100 includes the second reflector 20 having the second concave cylindrical surface 20a with the second radius R2a and the second convex cylindrical surface 20b with the same axis as the second concave cylindrical surface 20a. In other words, according to the first embodiment, it is possible to reduce a size and/or a weight of the second reflector 20.

As a result, it is possible to reduce a size and/or a weight of the telescope 100.

For example, in the case where the telescope 100 is installed in an artificial satellite or a space station, it is possible to reduce a volume ratio of the telescope 100 with respect to a space in the artificial satellite or the space station.

In the case where the telescope 100 includes the first fixing member 30 for fixing the first reflector 10 and the second fixing member 40 for fixing the second reflector 20, and the first fixing member 30 and the second fixing member 40 can be attached to each other, it is possible to separately transport the first fixing member 30 in which the first reflector 10 is included and the second fixing member 40 in which the second reflector 20 is included, and afterwards, to assemble the telescope 100 by attaching the first fixing member 30 to the second fixing member 40. It is possible to separately transport the first fixing member 30 in which the first reflector 10 is included and the second fixing member 40 in which the second reflector 20 is included, and thus, it is possible to easily transport the first fixing member 30 in which the first reflector 10 is included and the second fixing member 40 in which the second reflector 20 is included.

When the first fixing member 30 in which the first reflector 10 is included is transported in such a way that a direction without a curvature (Y direction) of the first concave cylindrical surface 10a of the first reflector 10 is the same as a direction of gravity or acceleration, the shape of the first concave cylindrical surface 10a in directions with a curvature (X direction and Z direction) of the first concave cylindrical surface 10a is not influenced by the gravity or the acceleration, and thus, it is possible to prevent or reduce the distortion of the first reflector 10.

When the second fixing member 40 in which the second reflector 20 is included is transported in such a way that a direction without a curvature (X direction) of the second concave cylindrical surface 20a of the second reflector 20 is the same as a direction of gravity or acceleration, the shape of the second concave cylindrical surface 20a in directions with a curvature (Y direction and Z direction) of the second concave cylindrical surface 20a is not influenced by the gravity or the acceleration, and thus, it is possible to prevent or reduce the distortion of the second reflector 20.

It is possible to prevent or reduce the resolution degradation of the telescope 100 assembled by attaching the first fixing member 30 in which the first reflector 10 is included to the second fixing member 40 in which the second reflector 20 is included.

For example, in the case where the first fixing member 30 in which the first reflector 10 is included and the second fixing member 40 in which the second reflector 20 is included are transported into an outer space by a rocket, etc., it is preferable to make the direction without a curvature (Y direction) of the first concave cylindrical surface 10a and the direction without a curvature (X direction) of the second concave cylindrical surface 20a be the same as a direction of acceleration of the rocket, etc. In this case, it is possible to prevent or reduce the possible distortion, caused by acceleration of the rocket, etc., of the first concave cylindrical surface 10a of the first reflector 10 and the second concave cylindrical surface 20a of the second reflector 20. Further, after the acceleration of the rocket, etc., is stopped, the first fixing member 30 in which the first reflector 10 is included is attached to the second fixing member 40 in which the second reflector 20 is included.

FIGS. 4A-4G are drawings illustrating a method of manufacturing a telescope according to a second embodiment. Each of FIG. 4A, FIG. 4B, FIG. 4C, FIG. 4D, FIG. 4E, FIG. 4F, and FIG. 4G is a drawing illustrating a step of a method of manufacturing a telescope according to the second embodiment.

As shown in FIGS. 4A-4G, a method of manufacturing a telescope 100 according to the second embodiment may include, for example, steps shown in FIGS. 4A-4G.

Figure 4A:
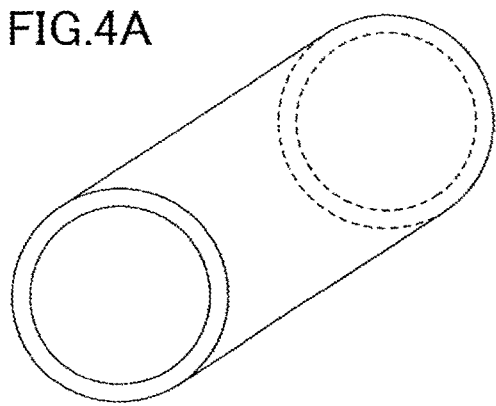
FIGS. 4A-4G are drawings illustrating a method of manufacturing a telescope according to a second embodiment.

In a step shown in FIG. 4A, a first tube having a first concave cylindrical surface 10a with a first radius R1a and a first central axis and a second tube having a second concave cylindrical surface 20a with a second radius R2a different from the first radius R1a and a second central axis are prepared.

Figure 4B:
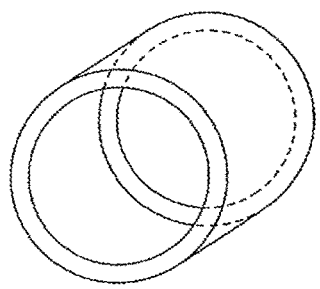

In a step shown in FIG. 4B, the first tube having the first concave cylindrical surface 10a with the first radius R1a and the first central axis is cut in a direction perpendicular to the first central axis of the first tube to form the first tube having a predetermined length in the first central axis direction, and the second tube having the second concave cylindrical surface 20a with the second radius R2a and the second central axis is cut in a direction perpendicular to the second central axis of the second tube to form the second tube having a predetermined length in the second central axis direction.

Figure 4C:
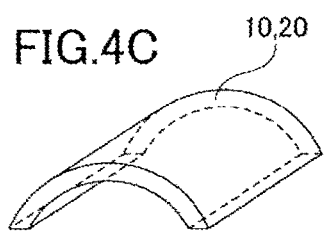

In a step shown in FIG. 4C, the first tube having the first concave cylindrical surface 10a with the first radius R1a and the first central axis, having a predetermined length in the first central axis direction, is cut in a direction parallel to the central axis of the first tube to manufacture the first reflector 10, and the second tube having the second concave cylindrical surface 20a with the second radius R2a and the second central axis, having a predetermined length in the second central axis direction, is cut in a direction parallel to the second central axis of the second tube to manufacture the second reflector 20. In the step shown in FIG. 4C, when the first reflector 10 is manufactured, the shape of the first concave cylindrical surface 10a is adjusted by grinding the first concave cylindrical surface 10a in a direction perpendicular to the first central axis if necessary. In the step shown in FIG. 4C, when the second reflector 20 is manufactured, the shape of the second concave cylindrical surface 20a is adjusted by grinding the second concave cylindrical surface 20a in a direction perpendicular to the second central axis if necessary.

Figure 4D:
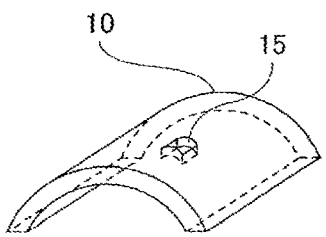

In a step shown in FIG. 4D, the opening 15 is formed in the central part of the first reflector 10.

Figure 4E:
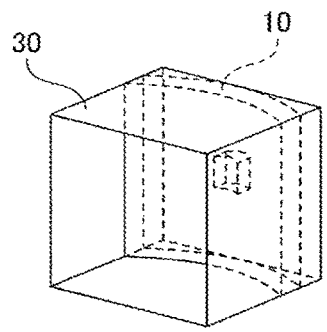

In a step shown in FIG. 4E, the first reflector 10 is fixed to the first fixing member 30.

Figure 4F:
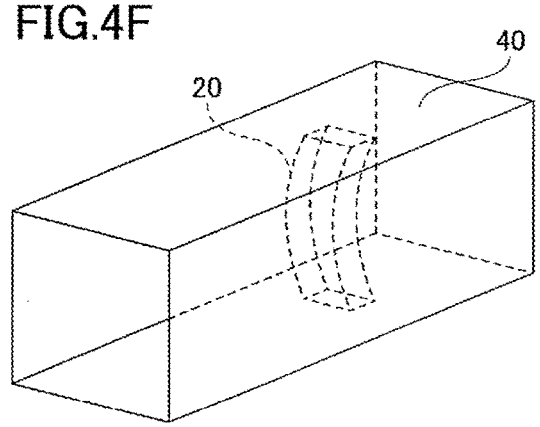

In a step shown in FIG. 4F, the second reflector 20 is fixed to the second fixing member 40, the second fixing member 40 being attachable to the first fixing member 30.

Figure 4G:
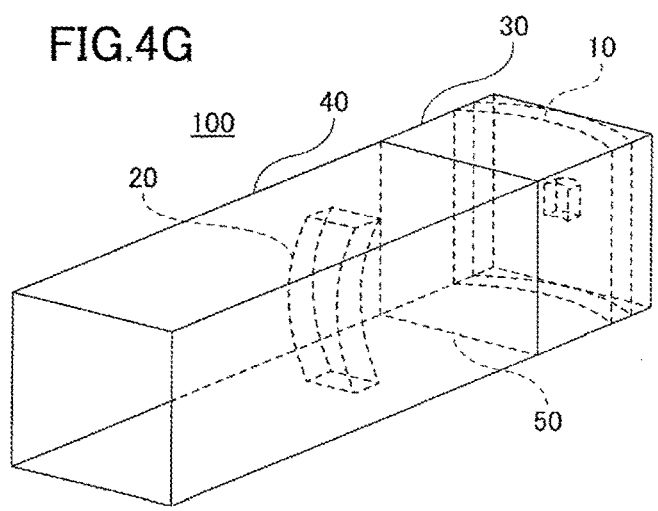

In a step shown in FIG. 4G, the fixing member of the telescope 100 is formed by attaching the second fixing member 40 to the first fixing member 30. Here, as shown in FIG. 4G, the first reflector 10 and the second reflector 20 are fixed in such a way that the first concave cylindrical surface 10a and the second concave cylindrical surface 20a face each other and the central axis of the first concave cylindrical surface 10a and the central axis of the second concave cylindrical surface 20a are orthogonal to each other.

It should be noted that, instead of the steps shown in FIGS. 4E, 4F, and 4G, the first reflector 10 and the second reflector 20 may be fixed to a single fixing member of the telescope 100.

According to the second embodiment, the method of manufacturing a telescope includes a first step of manufacturing the first reflector 10 having the first concave cylindrical surface 10a by cutting parallel to the first central axis the first tube having the first concave cylindrical surface 10a with the first radius R1a and the first central axis, and thus, it is possible to manufacture the first reflector 10 from the first tube having the first concave cylindrical surface 10a. In other words, according to the second embodiment, the first reflector 10 can be manufactured more easily.

According to the second embodiment, the method of manufacturing a telescope includes a second step of manufacturing the second reflector 20 having the second concave cylindrical surface 20a by cutting parallel to the second central axis the second tube having the second concave cylindrical surface 20a with the second radius R2a different from the first radius R1a and the second central axis, and thus, it is possible to manufacture the second reflector 20 from the second tube having the second concave cylindrical surface 20a. In other words, according to the second embodiment, the second reflector 20 can be manufactured more easily.

As a result, the telescope 100 can be manufactured more easily.

According to the second embodiment, the first reflector 10 can be manufactured more easily, and thus, it is easy to exchange the first reflector 10 included in the telescope 100.

According to the second embodiment, the second reflector 20 can be manufactured more easily, and thus, it is easy to exchange the second reflector 20 included in the telescope 100.

According to the second embodiment, it is possible to adjust the shape of the first concave cylindrical surface 10a by grinding the first concave cylindrical surface 10a in a direction orthogonal to the central axis of the first concave cylindrical surface 10a, if necessary, in the first step of manufacturing the first reflector 10 having the first concave cylindrical surface 10a.

According to the second embodiment, it is possible to adjust the shape of the second concave cylindrical surface 20a by grinding the second concave cylindrical surface 20a in a direction orthogonal to the central axis of the second concave cylindrical surface 20a, if necessary, in the second step of manufacturing the second reflector 20 having the second concave cylindrical surface 20a.

As a result, the telescope 100 can be maintained more easily.

According to the second embodiment, the method of manufacturing a telescope includes a first step of manufacturing the first reflector 10 having the first concave cylindrical surface 10a by cutting parallel to the first central axis the first tube having the first concave cylindrical surface 10a with the first radius R1a and the first central axis, and thus, it is possible to manufacture the first reflector 10 having the first concave cylindrical surface 10a with the first radius R1a and the first convex cylindrical surface 10b with the same axis as the first concave cylindrical surface 10a. Accordingly, it is possible to reduce a volume and/or a weight of the first reflector 10. In other words, according to the second embodiment, it is possible to reduce a size and/or a weight of the first reflector 10.

According to the second embodiment, the method of manufacturing a telescope includes a second step of manufacturing the second reflector 20 having the second concave cylindrical surface 20a by cutting parallel to the second central axis the second tube having the second concave cylindrical surface 20a with the second radius R2a different from the first radius R1a and the second central axis, and thus, it is possible to manufacture the second reflector 20 having the second concave cylindrical surface 20a with the second radius R2a and the second convex cylindrical surface 20b with the same axis as the second concave cylindrical surface 20a. Accordingly, it is possible to reduce a volume and/or a weight of the second reflector 20. In other words, according to the second embodiment, it is possible to reduce a size and/or a weight of the second reflector 20.

As a result, it is possible to reduce a size and/or a weight of the telescope 100.

For example, in the case where the telescope 100 is installed in an artificial satellite or a space station, it is possible to reduce a volume ratio of the telescope 100 with respect to a space in the artificial satellite or the space station.

In the case where the third step includes fixing the first reflector 10 to the first fixing member 30 and fixing the second reflector 20 to the second fixing member 40, the second fixing member 40 being attachable to the first fixing member 30, and attaching the second fixing member 40 to the first fixing member 30, it is possible to separately transport the first fixing member 30 in which the first reflector 10 is included and the second fixing member 40 in which the second reflector 20 is included, and afterwards, to assemble the telescope 100 by attaching the first fixing member 30 to the second fixing member 40. It is possible to separately transport the first fixing member 30 in which the first reflector 10 is included and the second fixing member 40 in which the second reflector 20 is included, and thus, it is possible to easily transport the first fixing member 30 in which the first reflector 10 is included and the second fixing member 40 in which the second reflector 20 is included.

When the first fixing member 30 in which the first reflector 10 is included is transported in such a way that a direction without a curvature (Y direction) of the first concave cylindrical surface 10a of the first reflector 10 is the same as a direction of gravity or acceleration, the shape of the first concave cylindrical surface 10a in directions with a curvature (X direction and Z direction) of the first concave cylindrical surface 10a is not influenced by the gravity or the acceleration, and thus, it is possible to prevent or reduce the distortion of the first reflector 10.

When the second fixing member 40 in which the second reflector 20 is included is transported in such a way that a direction without a curvature (X direction) of the second concave cylindrical surface 20a of the second reflector 20 is the same as a direction of gravity or acceleration, the shape of the second concave cylindrical surface 20a in directions with a curvature (Y direction and Z direction) of the second concave cylindrical surface 20a is not influenced by the gravity or the acceleration, and thus, it is possible to prevent or reduce the distortion of the second reflector 20.

It is possible to prevent or reduce the resolution degradation of the telescope 100 assembled by attaching the first fixing member 30 in which the first reflector 10 is included to the second fixing member 40 in which the second reflector 20 is included.

For example, in the case where the first fixing member 30 in which the first reflector 10 is included and the second fixing member 40 in which the second reflector 20 is included are transported into an outer space by a rocket, etc., it is preferable to make the direction without a curvature (Y direction) of the first concave cylindrical surface 10a and the direction without a curvature (X direction) of the second concave cylindrical surface 20a be the same as a direction of acceleration of the rocket, etc. In this case, it is possible to prevent or reduce the distortion caused by the acceleration of the rocket, etc., of the first concave cylindrical surface 10a of the first reflector 10 and the second concave cylindrical surface 20a of the second reflector 20. Further, after the acceleration of the rocket, etc., is stopped, the first fixing member 30 in which the first reflector 10 is included is attached to the second fixing member 40 in which the second reflector 20 is included.

The embodiments of the present invention have been specifically described by referring to the accompanying drawings. However, the present invention is not limited to the above embodiments. Various modifications, replacements, and combinations may be made possible without departing from the scope of the present invention.

An aspect of the present invention may be applied to one of a telescope and a method of manufacturing a telescope.

What is claimed is:

1. A telescope comprising:
a first reflector configured to have a first concave cylindrical surface with a first radius;
a second reflector configured to have a second concave cylindrical surface with a second radius different from the first radius; and
a fixing member configured to fix the first reflector and the second reflector in such a way that the first concave cylindrical surface and the second concave cylindrical surface face each other, and a first central axis of the first concave cylindrical surface and a second central axis of the second concave cylindrical surface are orthogonal to each other,
wherein,
the first reflector has a first convex cylindrical surface with the same first central axis as the first concave cylindrical surface, and
the second reflector has a second convex cylindrical surface with the same second central axis as the second concave cylindrical surface,
and wherein,
the first concave cylindrical surface is an inner surface of a first portion of a first tube and the first convex cylindrical surface is an outer surface of the first portion of the first tube, and
the second concave cylindrical surface is an inner surface of a second portion of a second tube and the second convex cylindrical surface is an outer surface of the second portion of the second tube.

2. The telescope according to claim 1, wherein
the fixing member includes a first fixing member for fixing the first reflector and a second fixing member for fixing the second reflector, and
the first fixing member and the second fixing member can be attached to each other.

3. The telescope according to claim 1, wherein
the fixing member includes a first fixing member for fixing the first reflector and a second fixing member for fixing the second reflector, and
the first fixing member and the second fixing member can be attached to each other.

4. A method of manufacturing a telescope, the method comprising:
a first step of manufacturing a first reflector having a first concave cylindrical surface by cutting a first tube, having the first concave cylindrical surface with a first radius and a first central axis, parallel to the first central axis;
a second step of manufacturing a second reflector having a second concave cylindrical surface by cutting a second tube, having the second concave cylindrical surface with a second radius different from the first radius and a second central axis, parallel to the second central axis; and
a third step of fixing the first reflector and the second reflector in such a way that the first concave cylindrical surface and the second concave cylindrical surface face each other, and that a central axis of the first concave cylindrical surface and a central axis of the second concave cylindrical surface are orthogonal to each other, wherein
the first reflector has a first convex cylindrical surface with the same central axis as the first concave cylindrical surface, and
the second reflector has a second convex cylindrical surface with the same central axis as the second concave cylindrical surface.

5. The method of manufacturing a telescope according to claim 4, wherein
the third step includes a step of fixing the first reflector to a first fixing member, fixing the second reflector to a second fixing member capable of being attached to the first fixing member, and attaching the second fixing member to the first fixing member.

* * * * *